(12) United States Patent
Wang et al.

(10) Patent No.: US 6,424,730 B1
(45) Date of Patent: Jul. 23, 2002

(54) MEDICAL IMAGE ENHANCEMENT METHOD FOR HARDCOPY PRINTS

(75) Inventors: Xiaohui Wang, Rochester; Richard L. VanMetter, Webster, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/185,348

(22) Filed: Nov. 3, 1998

(51) Int. Cl.⁷ .................................................. G06K 9/00
(52) U.S. Cl. ........................ 382/128; 128/922; 356/39
(58) Field of Search ................................ 382/128, 254, 382/263, 199; 600/408, 407; 378/19; 128/922; 356/39

(56) References Cited

U.S. PATENT DOCUMENTS

| | | | |
|---|---|---|---|
| 4,315,318 A | 2/1982 | Kato et al. | 382/264 |
| 4,317,179 A | 2/1982 | Kato et al. | |
| 4,346,409 A | 8/1982 | Ishida et al. | 358/458 |
| 4,387,428 A | 6/1983 | Ishida et al. | 250/362 |
| 4,571,635 A | 2/1986 | Mahmondi et al. | 358/510 |
| 4,590,582 A * | 5/1986 | Umemura | 364/724 |
| 4,747,052 A | 5/1988 | Hishinuma et al. | 250/587 |
| 4,783,840 A | 11/1988 | Song | 382/261 |
| 4,794,531 A | 12/1988 | Morishita et al. | 382/132 |
| 4,908,876 A * | 3/1990 | Deforest et al. | 382/54 |
| 4,941,190 A | 7/1990 | Joyce | 382/264 |
| 5,038,388 A | 8/1991 | Song | 382/266 |
| 5,204,919 A | 4/1993 | Murakami | 382/263 |
| 5,319,719 A | 6/1994 | Nakazawa et al. | 382/132 |
| 5,369,572 A | 11/1994 | Haraki et al. | 378/83 |
| 5,454,044 A | 9/1995 | Nakajima | 382/132 |
| 5,493,622 A | 2/1996 | Tsuchino et al. | 382/132 |
| 5,604,780 A | 2/1997 | Nakazawa et al. | 378/62 |
| 5,608,813 A | 3/1997 | Nakajima | 382/132 |
| 5,774,599 A | 6/1998 | Muka et al. | 382/254 |
| 5,799,111 A * | 8/1998 | Guissin | 382/254 |
| 5,848,117 A * | 12/1998 | Urchuck et al. | 378/19 |
| 5,898,797 A * | 4/1999 | Weiss et al. | 382/199 |
| 6,058,322 A * | 5/2000 | Nishikawa et al. | 600/408 |

OTHER PUBLICATIONS

H. Blume, "The ACR/NEMA Proposal for a Grey–Scale Display Function Standard," SPIE, vol. 2707, pp. 344–360.
G. Ramponi et al, "Nonlinear Unsharp Masking Methods for Image Contrast Enhancement," Journal of Electronic Imaging, vol. 5(3), Jul. 1996, pp. 353–366.
F.P.Ph. De Vries, "Automatic Adaptive, Brightness Independent Contrast Enhancement," Signal Processing, vol. 21, No. 2, Oct. 1990, pp. 169–182.

* cited by examiner

Primary Examiner—Leo Boudreau
Assistant Examiner—M B Choobin
(74) Attorney, Agent, or Firm—William F. Noval

(57) ABSTRACT

A method for the enhancement of medical images for hardcopy prints comprising the steps of: obtaining a medical image in digital format; conducting a plurality of operations for Human Visual System (HVS)-based edge enhancement with each operation having a uniquely specified high frequency amplification function and range such that edges are more enhanced in the shadow region than in the highlight region; adjusting image tone scale, for reflection prints increase the contrast in the shadow region and decrease the contrast in the highlight region, and for transparency prints decrease the contrast in the shadow region and increase the contrast in the highlight region; sending the processed image to the output device for hardcopy prints.

35 Claims, 3 Drawing Sheets

MEDICAL IMAGE ENHANCEMENT METHOD FOR HARDCOPY PRINTS

FIELD OF THE INVENTION

This invention relates in general to a method for the enhancement of medical images for hardcopy prints. More particularly, it relates to such a method which compensates for the losses of image high frequency contents due to the limited capability of the output device and which mimics the image tone scale on the hardcopy prints of the trans-illuminated film on a standard diagnostic lightbox.

BACKGROUND OF THE INVENTION

As picture archiving and communication systems (PACs) have been widely installed and tested in the clinical environment, a virtual radiology department with multi-facilities has been gradually established in which medical images can be accessed and viewed using softcopy displays anywhere across the entire computer network. In such a situation, hardcopy prints of medical images seem obsolete and unnecessary. However, this is not true and hardcopies will always be needed for various purposes. For example, for referral medical report an attached image can greatly facilitate the descriptions.

Photographic inkjet printers and direct thermal printers are among the best choices for non-diagnostic, referral printing due to their wide availability, low cost and portability. However, when using such a printer to directly print medical images for the referral purpose, there are several major challenges: (1) reduced image local contrast and blurred details due to the limited spatial resolution of the printer, and (2) image tone scale which is different from trans-illuminated film because of either the limited density dynamic range of the printer or the reduced viewing luminance.

The spatial frequency bandwidth of both inkjet and direct thermal printers is limited due to the halftone algorithms used in the printer technology. As a result, the printed image look quite blurred and local contrast in the image is significantly reduced. Consequently, important diagnostic details, which are often associated with the high frequency contents of the image, are undesirably suppressed. To compensate for the limited spatial resolution of the printer, it is essential to enhance the image details prior to printing.

When a medical image is printed on a reflection medium such as paper, or a trans-illuminated medium such as transparency, its tone scale is usually different from its film image. The optical density which can be produced on the medium and the image viewing luminance are two dominant factors in causing the tone scale difference. For the same image, when viewing in an indoor ambient light condition, a reflection print always looks darker in the mid-tone region than the film displayed on a lightbox, even if they are printed using the same optical density. The luminance of a lightbox used in the standard diagnostic environment is approximately 2,500 $cd/m^2$, and the typical minimum and maximum optical densities on a film are 0.21 and 3.0, respectively. Therefore, the maximum transmitance luminance produced by the film/lightbox is more than 1500 $cd/m^2$ and an luminance dynamic range of 620:1 can be achieved. Under such a high luminance level and wide dynamic range, a typical human observer can tell around 800 Just Noticeable Differences (JNDs) of luminance changes in an image, based on Barten's model of the human visual system (HVS) using a standard target (H. Blume, "The act/nema proposal for a grey-scale display function standard," SPIE Medical Imaging, Vol. 2707, pp. 344–360, 1996).

On the other hand, the luminance of an indoor environment with diffusive light condition varies dramatically, from about fifty to several hundred $cd/m^2$. The typical minimum and maximum densities on a photographic reflection print are around 0.1 and 2.2, respectively, which generate a dynamic range of 120:1 and a maximum reflectance luminance of 120 $cd/m^2$ if a luminance of 150 $cd/m^2$ is assumed for a surface with 100% reflectance. Again based on Barten's model there are only about 400 JNDs that can be perceived on the reflection print. When using a photographic printer to print an image on a transparency, the produced density range is usually lower than a film. If such an image is displayed on the lightbox, a less number of JNDs can be perceived on the transparency than on the film, which make the image look flat.

Other factors associated with the photographic printers, such as quantization of the input data, further reduce the JNDs that can be perceived on a hardcopy print. Photographic printers ordinarily take only 8-bit data input and therefore can print 256 greylevels at most. On the other hand, film printers often use 12-bit data input and are able to generate sufficient greylevels for diagnostic purposes.

It is preferable to display a medical image on a hardcopy print in a consistent way and with the similar perceptual image quality of film. In the clinical field, many x-ray images are evaluated on films for primary diagnostics even if digital x-ray images exist and softcopy displays are available. Also, images from other modalities, such as Computed Tomography (CT) or Magnetic Resonance Imaging (MRI), are often printed and viewed on films. A number of reasons can be given for this including cost, legal liability, as well as the unquestionable fact that most radiologists acquired their reading skills by viewing hardcopy films. Therefore, it is highly recommended to use film images as the gold standard for visualization and generate hardcopy prints that have similar tone scale to films.

Important diagnostic details are often associated with certain image features such as edges or textures. Enhancement of these image features usually involves in increasing local contrast and sharpening edges. For this purpose, histogram equalization and unsharp masking are two major classes of techniques.

A histogram equalization technique based on the whole image content is suitable to enhance the global image contrast instead of local contrast, and it sometimes attenuates the contrast of the image regions which have scarce population. On the other hand, a histogram equalization technique based on the local image content is designed to enhance the local contrast. However, it is computationally expensive (R. C. Gonzalez and R. E. Woods, *Digital Image Processing*, pp. 173–189, Addison-Wesley Publishing Company, 1993). In addition, histogram equalization techniques do not sharpen edges in order to address the problem caused by the limited spatial resolution of a printer.

An unsharp masking technique, broadly speaking, consists of decomposing an image into a low frequency component and a high frequency component, manipulating either component individually then combining them together. Since edges and texture in an image are usually the high frequency content, edge sharpening and local contrast enhancement can be achieved by boosting the high frequency component.

Various approaches have been developed for unsharp masking technique to decide and control the low and high frequency components of an image. The high frequency component can be determined either using a linear or a nonlinear high pass filter. Certain quadratic operators are commonly used as nonlinear filters to conduct the high pass operation (G. Ramponi, N. Strobel, S. K. Mitra, and T-H. Yu, "Nonlinear unsharp masking methods for image contrast enhancement," *Journal of Electronic Imaging*, Vol. 5, No. 3, pp. 353–366, 1996). On the other hand, since the high frequency component of an image can be computed as the difference between the original image and a low pass filtered version of that image, a median filter, which is nonlinear, can be used for low pass filtering to obtain the high frequency component (R. C. Gonzalez and R. E. Woods, *Digital Image Processing*, pp. 191–195, Addison-Wesley Publishing Company, 1993). However, the computation is usually expensive for a nonlinear filter with a large kernel. A convolution operator with positive coefficients around its center and negative coefficients in the outer periphery, for example an Laplacian filter, constitutes a linear high pass filter. Due to the fact that a linear filter is easy to implement and fast in execution, it has been widely used in unsharp masking techniques. In practice, a rectangle operator with all the coefficients being equal to unity is the most commonly used linear low pass filter, and the high frequency component of an image is obtained with the subtraction from the original image of the low frequency component.

For the unsharp masking techniques, many methods have been developed to combine the high frequency and low frequency components of an image. Most of them leave the low frequency component unchanged and manipulate only the high frequency component. For example, the high frequency component is multiplied by a boost factor a, then is added to the original image, as given by Eq. 1, $$P=O+\alpha \cdot H, \qquad (1)$$

where P is the processed image, O is the original image and H is the high frequency component, respectively. Murakami disclosed a method to determine the boost factor a based on the observing distance and the spatial frequency content of the image (U.S. Pat. No. 5,204,919, issued 1990, inventor Murakami). The boost factor can also be decided based on the statistics of the pixel values of the images, as proposed by Mohamoodi (U.S. Pat. No. 4,571,635, issued 1984, A. B. Mohmoodi). To improve the computation efficiency for hardware execution, Joyce used an annular mean and an annular standard deviation to compute the boost factor (U.S. Pat. No. 4,941,190, issued 1988, inventor T. H. Joyce). Morishita et al proposed to divide the entire image into a plurality of regional images, and for each regional image the boost factor is determined based on either the pixel value of the original image or the standard deviation of the regional pixel values (U.S. Pat. No. 4,794,531, issued 1987, inventors K. Morishita, et al). Song has patented two algorithms, in which the boost factor is determined adaptively based on the variance of the surrounding pixel values, the noise power spectrum of the image system, and the patterns in the image (U.S. Pat. No. 4,783,840, issued 1987, inventor W. J. Song; and U.S. Pat. No. 5,038,388, issued 1989, inventor W. J. Song). Hishinuma et al computed the boost factor based on the median value of a group of pixels within the unsharp mask of a predetermined size (U.S. Pat. No. 4,747,052, issued 1985, inventors K. Hishinuma et al). Kato et al used a boost factor that varies with either the original or its low frequency component (U.S. Pat. No. 4,315,318, issued 1979, inventors H. Kato et al; and U.S. Pat. No. 4,317,179, issued 1979, inventors H. Kato et al). There are a handful of other algorithms that further combine the boost factor with the high frequency component together, which is broadly described by Eq. 2, $$P=O+f(H), \qquad (2)$$

where f(H) is a function of H. Haraki et al patented an algorithm in which f(H) varies in a certain way with the absolute value of H (U.S. Pat. No. 5,369,572, issued 1992, inventors Haraki et al). Ishida et. al recommended f(H) increase monotonically with H (U.S. Pat. No. 4,387,428, issued 1980, inventors Ishida et al; and U.S. Pat. No. 4,346,409, issued 1980, inventors Ishida et al). All the above mentioned methods (Eqs. 1–2) are effective in sharpening edges and enhancing local contrast, but none of them tried to address the problems caused by the reduced viewing luminance and the limited dynamic range of the output device, i.e., to propose a solution to compress the dynamic range of the image and adjust the image tone scale.

To compress the dynamic range of an image, the low frequency component can also be processed, which is mathematically described by Eq. 3, $$P=O-\beta \cdot L, \qquad (3)$$

where β is an attenuation factor. Nakazawa et al used a positive β which is less than unity to reduce the dynamic range of the low frequency component, while leaving the high frequency unchanged (U.S. Pat. No. 5,319,719, issued 1992, inventors Nakazawa et al). Further improvement of this method includes combining β and L together, as given by Eq. 4, $$P=O+g(L), \qquad (4)$$

where g(L) is a function of L. Nakazawa et al tried a method in which g(L) is a function that decreases as L increases (U.S. Pat. No. 5,454,044, issued 1994, inventor Nakajima). More specifically, Nakajima recommended g(L) should decrease monotonically as the value of L increases (U.S. Pat. No. 5,454,044, issued 1994, inventor Nakajima; and U.S. Pat. No. 5,608,813, issued 1995, inventor Nakajima). Another algorithm by Nakazawa et al uses a very broad function description (Eq. 5), $$P=A(O)+B(L), \qquad (5)$$

where A(O) is a function of O only, and B(L) is a function of L only (U.S. Pat. No. 5,604,780, issued 1995, inventors Nakazawa et al). All the methods in Eqs. 3–5 can be used to effectively compress the image dynamic range, however, they do not sharpen edges and enhance local contrast in order to compensate for the limited spatial resolution of the output devices.

Several early publications also revealed algorithms that process both the low frequency and high frequency components. Tsuchino et al used an algorithm based on Eq. 6 (U.S. Pat. No. 5,493,622, issued 1994, inventors Tsuchino et al), $$P=O+f_1(L_1)+g(O-L_2). \qquad (6)$$

This is a good approach in that it uses $f_1(L_1)$ to compress the dynamic range in a low frequency region $L_1$ of the original image, at the same time uses $g(O-L_2)$ to boost a different high frequency region $H_2=O-L_2$. Muka et al tested their algorithm in which the attenuation of the low frequency and the amplification of the high frequency are based on the input/output luminance dynamic ranges, the spatial frequency bandwidth of the output device and knowledge of the human visual system (U.S. Pat. No. 5,774,599, issued Jun. 30, 1998, inventors Muka et al). However, no adaptive dependency of attenuation/amplification on individual image pixel value is used by this algorithm. Nevertheless, the image tone scale is still one of the problems to be addressed.

Other prior art on image enhancement and tone scale adjustment includes the one from Varies (F.P.P.D. Varies, "Automatic, adaptive, brightness independent contrast enhancement," *Signal Processing*, No. 21, pp. 169–182, 1990). In his work the author used logarithmic and exponential calculations for dynamic range transform and applied adaptive local difference operator in the logarithmic domain for local contrast enhancement. While good image quality is expected, the computation is complicated and may be formidable for a large image of 2500×2048 pixels.

SUMMARY OF THE INVENTION

In view of the above mentioned drawbacks of the related prior art, the objective of the present invention is to provide a computationally efficient method of digital image processing, especially edge sharpening and tone scale adjustment of medical images, for hardcopy prints which (1) are produced by output devices with limited capabilities, such as a limited spatial resolution and dynamic range, and/or (2) are viewed in a limited viewing conditions, such an indoor ambient light environment.

According to a feature of the present invention, there is provided a method for edge sharpening and tone scale adjustment of digital images compromising the steps of: (1) obtaining a medical image in digital format; (2) conducting a plurality of operations for Human Visual System (HVS)-based edge enhancement with each operation having a uniquely specified frequency amplification function and range, such that edges are more enhanced in the shadow region than in the highlight region; (3) adjusting the image tone scale to match that of a trans-illuminated film: for a reflection print, the local contrast in the shadow region is enhanced while that in the highlight region is suppressed, and for a transparency print, the local contrast in the shadow region is suppressed while that in the highlight region is enhanced; (4) sending the processed image to the output device for hardcopy prints.

ADVANTAGEOUS EFFECT OF THE INVENTION

The present invention has the following advantages:

1. Edges sharpening of medical images is human visual system based; edges are more enhanced in the shadow region than in the highlight region, therefore a uniformly perceived edge enhancement can be achieved across the entire image while the noise can be suppressed to a desirable level.

2. Tone scale adjustment of medical images is human visual system based. An image tone scale similar to that of a film can be achieved while the dynamic range of the input image is compressed simultaneously.

3. Edge enhancement and image tone scale can be adjusted based on the observer's preference, diagnostic regions of interest, and the characteristics of the output devices.

DETAILED DESCRIPTION OF THE INVENTION

In general, the present invention is to provide a computationally efficient method of digital image processing, especially edge sharpening and tone scale adjustment of medical images, for hardcopy prints which (1) are produced by output devices with limited capabilities, such as a limited spatial resolution and dynamic range, and/or (2) are viewed in a limited viewing conditions, such an indoor ambient light environment. Both edge sharpening and tone scale adjustment proposed in the present invention are HVS based. Edges are more enhanced in the shadow region of an image than in the highlight region, therefore a uniformly perceived edge enhancement can be achieved across the entire image while the noise can be suppressed to a desirable level. By using tone scale adjustment, for reflection print local contrast in the shadow region is enhanced while that in the highlight region is suppressed, and for transparency print local contrast in the shadow region is suppressed while that in the highlight region is enhanced, therefore an image tone scale similar to that of a film can be achieved while the dynamic range of the input image is compressed simultaneously. Furthermore, the edge enhancement and tone scale adjustment can be adjusted based on the observer's preference, diagnostic regions of interest and the characteristics of the output devices.

Figure 1:
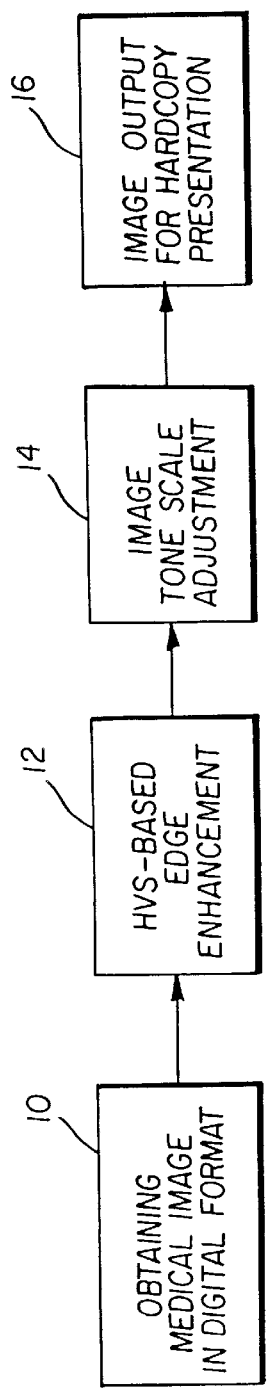
FIG. 1 is a flow chart of illustrating the method of the present invention.

The present invention consists of four major stages of operations as shown in FIG. 1:

1. obtaining a medical image in digital format (box 10);
2. conducting a plurality of operations for HVS-based edge enhancement with each operation having a uniquely specified frequency amplification function and range (box 12);
3. for reflection print, adjusting image tone scale to increase the contrast in the shadow region and decrease the contrast in the highlight region, and for transparency print, adjusting image tone scale to decrease the contrast in the shadow region and increase the contrast in the highlight region (box 14);
4. sending the processed image to the output device for hardcopy prints (box 16).

The reflection hardcopy prints are usually viewed in an indoor ambient light condition, and the transparency prints are displayed on a standard diagnostic lightbox. The hardcopies are produced by a printer capable of printing images on either reflection or transparency media, for example, a direct thermal printer, a inkjet printer, a dot matrix printer, a laser printer or etc.

The method of the present invention is described as a series of operations performed on a digital medical image. The digital image can be formed by a digital image acquisition system. The image acquisition system can be, for example, (1) a standard x-ray screen/film combination which produces an x-ray film image which is processed chemically or thermally and the processed film digitized by a scanner/digitizer; (2) a computed radiography (CR) system where a latent x-ray image is formed in a storage phosphor and a corresponding digital image is produced by reading out the storage phosphor by a CR reader; (3) a direct radiography (DR) system where an x-ray image is directly acquired by the flat-panel detector array; (4) a direct digital acquisition system typically consisting of a phosphor based scintillating screen coupled to an imager (CCD, MOS) through a lens or fiber optic system; and (5) a diagnostic scanner (such as MRI, CT, US, PET) which produces either directly a digital image or an electronic image which is digitized.

Figure 5:
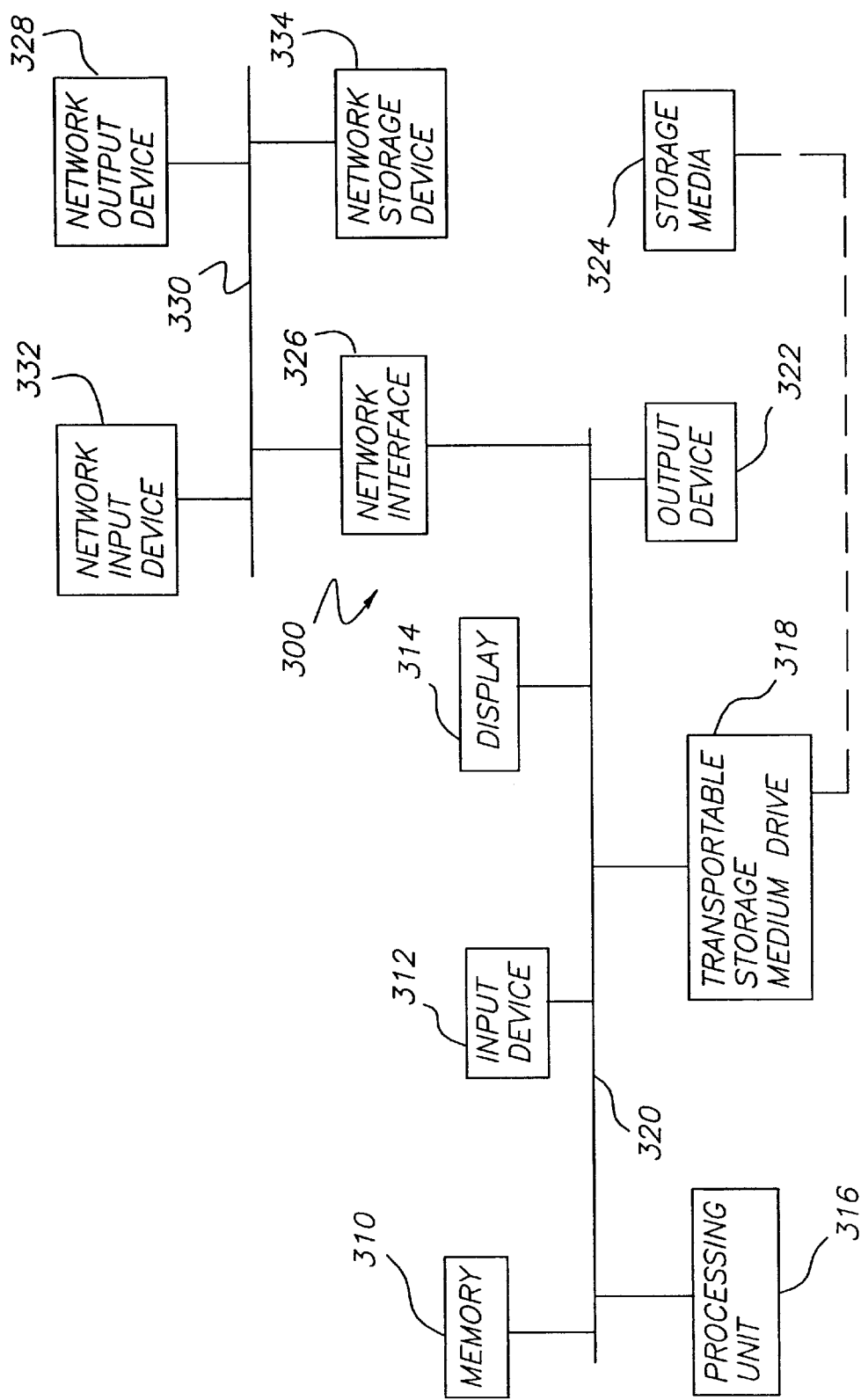
FIG. 5 is a block diagram of a digital image processor for carrying out the method of the present invention.

The digital image is processed in an image processor, according to the method of the present invention. The image processor can take the form of a digital computer, such as illustrated in FIG. 5. In such case, one or more of the steps of said method can be carried out using software routines. The image processor can also include hardware or firmware for carrying out one or more of said method steps. Thus, the steps of the method of the invention can be carried out using software, firmware, and hardware, either alone or in any preferable combination.

As shown in FIG. 5, a digital computer 300 includes a memory 310 for storing digital images, application programs, operating system, etc. Memory 310 can include mass memory (such as a hard magnetic disc or CD ROM), and fast memory (such as RAM). Computer 300 also includes input device 312 (such as a keyboard, mouse, touch screen), display 314 (CRT monitor, LCD), central processing unit 316 (microprocessor). Components 310,312,314, 316 are connected together by control/data bus 320. Computer 300 can include a transportable storage medium drive 318 for reading from and/or writing to transportable storage media 324, such as a floppy magnetic disk or writeable optical compact disk (CD). Computer 300 can include a computer network interface 326 for reading from and/or writing to the computer network 330, in which case the network interface 326 is connected to the control/data bus 320. Computer 300 can include a directly connected output device 322 (thermal printer, dot matrix printer, laser printer, ink jet printer) and/or a computer network 300 connected output device 328. Computer 300 can include an input device 332 which is connected to the computer network. Computer 300 can also include a network storage device 334 which is connected to the computer network.

As used in this application, computer readable storage medium can include, specifically, memory 310 and transportable storage medium 324. More generally, computer storage medium may comprise, for example, magnetic storage media, such as magnetic disk (hard drive, floppy disk) or magnetic tape; optical storage media, such as optical disk, optical tape, or machine readable bar code; solid state electronic storage devices, such as random access memory (RAM), read only memory (ROM); or any other physical device or medium which can be employed to store a computer program.

HVS (Human Visual Response) Based Edge Sharpening

Certain image contents, such as edges and textures, are usually associated with the high frequency component of the image. With a suitable amplification of the high frequency component, edge sharpening and local contrast enhancement can be achieved. Depending on the diagnostic regions of interest, the imaging modality used to obtain the image, and the characteristics of the output devices, determination of the image high frequency component and its corresponding amplification function needs to be considered accordingly. Moreover, since human eyes are typically more sensitive to details in the highlight region of an image than in the shadow region, small details should be generally enhanced more strongly in the shadow region than those in the highlight region in order to achieve a uniformly perceived edge enhancement.

To improve the computation efficiency, in a preferred embodiment of the present invention, the low frequency component of an image is obtained by convoluting the image with a uniform rectangle convolution kernel, and the high frequency component of the image is obtained by subtracting the low frequency component from the original image. Unlike directly taking the frequency transform of the image, the rectangle convolution kernel only provides a means to decompose an image into the high frequency and low frequency components at a certain frequency separation point; it does not provide detailed frequency information, which makes frequency adaptive amplification impossible. To address this drawback, the present invention uses a plurality of steps of high frequency enhancement with each step having a uniquely specified frequency separation point and amplification function, as given by Eq. 7, $$P_{n+1} = L_n + \alpha_n \cdot H_n, \tag{7}$$

where $n \geq 0$ is the index for processing steps, $L_n$ and $H_n$ are the low and high frequency components of image $P_n$ at processing step n ($P_0$ is the original image O), and $\alpha_n$ being the amplification function, which will be described hereinafter. The implementation as expressed by Eq. 7 (1) takes the original image, decomposes it into the high and low frequency components, amplifies the high frequency component using function $\alpha_0$, then combines the low frequency component and the amplified high frequency component to form an intermediate image, (2) takes the intermediate image as the input and conducts edge enhancement using the same procedure as before except using a different frequency separation point and a different amplification function.

Determination of the amplification function $\alpha_n$ is based on the human visual system, diagnostic regions of interest and the characteristics of the output device. A constant $\alpha_n$ will equally enhance all the frequency signals beyond the frequency separation point. A large convolution kernel is often used with a constant amplification function $\alpha_n$ to slightly boost some edges that are associated with the range from the mid-frequency to the high-frequency of an image. Since a normal human observer can better differentiate local contrast changes in the highlight region than in the shadow region, edges in the shadow region need to be boosted more than in the highlight region in order to achieve uniformly perceived edge enhancement. On the other hand, since noise inherent in the image is also greatly boosted when enhancing the high frequency of the image, the edge enhancement needs to be conducted adaptively so that the perceived noise level can be controlled within tolerance. Based on this, function $\alpha_n$ should be monotonically increasing as the image varies from highlight regions to shadow regions. In a preferred embodiment of the present invention, $\alpha_n$ is a linear function of the pixel intensity $L_n$, for example, $$\alpha_n = \alpha_{min} + (\alpha_{max} - \alpha_{min}) \cdot \frac{L_n - L_{min}}{L_{max} - L_{min}}, \tag{8}$$

where $L_{max}$ and $L_{min}$ are the maximum and minimum values of $L_n$ (low frequency component), respectively, and $\alpha_{max}$ and $\alpha_{min}$ are the specified maximum and minimum values of $\alpha$(boost factors).

The images to be processed sometimes need a very large memory buffer in the computer. For example a 16-bit image with 2,500×2,048 pixels needs over ten megabytes of storage per image. The method as in Eq. 7 is a memory space saving implementation. However, in certain circumstances the high frequency amplification functions may not be easily controlled since they can be accumulated from step to step due to the use of intermediate images. Depending on the computer resources available, in another preferred embodiment of present invention, the edge enhancement is based on Eq. 9, $$P_{n+1} = L_0 + \sum_{i=0}^{n} [\alpha_n \cdot H_n], \quad (9)$$

where $n \geq 0$ is the index, $L_0$ is the low frequency component of the original image O, $H_n$ is the high frequency component of image O at the nth frequency separation point, $P_{n+1}$ is the final image, and $\alpha_n$ is the amplification function. The implementation as expressed by Eq. 9 needs more memory space but is easy to control. It first conducts a series of decomposition of the original image into a set of high and low frequency components with each decomposition having a different frequency separation point, then combines each individually amplified high frequency components to the first low frequency component to form a processed image.

The selection of the shape of the uniform rectangle convolution kernel is depending on the physical height and width of the pixels in the image. Usually a square kernel is used if the physical size of the pixel is also square, otherwise, a non-square kernel must be used based on Eq. 10, $$\frac{K_x}{K_y} = \frac{P_y}{P_x}, \quad (10)$$

where $P_x$ and $P_y$ are the pixel width and height, respectively, and $K_x$ and $K_y$ are the kernel width and height, respectively.

The selection of frequency separation point, or equivalently, the convolution kernel size, depends on the diagnostic regions of interest, imaging modality and the characteristics of the output device. For CR images, a small kernel ($\leq 1.5$ mm) with a large amplification can effectively enhance very small edges and details, however, the image noise is also enhanced simultaneously. Therefore, unless the image itself contains fine and important diagnostic details and structures, such as CR images of bones and joints, small kernel size is not recommended. On the contrary, for CT or MRI images, since the image pixel size usually is very large (~0.78 mm), a 3×3 kernel is equivalent to a physical area of 2.3×2.3 mm$^2$ and is enough to enhance the high frequency component. Table 1 shows a list of example parameters for high frequency amplification of some CR, CT and MRI images when a Kodak Digital Science 8650 PS printer is used as the output device. One can find that bone/joint and chest CR images need two steps of frequency boosts, but abdomen CR and CT/MRI images may only need one boost.

TABLE 1

A list of parameters for high frequency amplification of some CR, CT and MRI images when a Kodak Digital Science 8650 PS printer is used

| Modality | Exam Type | Kernel$_1$ (mm) | Boost factors$_1$ | Kernel$_2$ (mm) | Boost factors$_2$ |
|---|---|---|---|---|---|
| CR | Chest | 8.6 | (1.3, 1.3) | 4.3 | (1.0, 1.5) |
| CR | Bone/Joint | 6.0 | (1.3, 1.3) | 1.5 | (1.0, 4.0) |
| CR | Abdomen | 2.3 | (1.0, 3.0) | n/a | n/a |
| MRI |  | 2.3 | (2.0, 2.0) | n/a | n/a |
| CT |  | 2.3 | (2.0, 2.0) | n/a | n/a |

Figure 2:
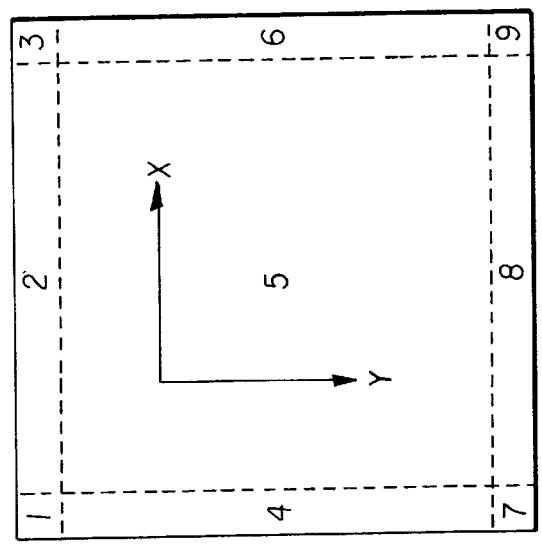
FIG. 2 is a diagrammatic view defining the nine sub-regions for high and low frequency decomposition of an image.

Once the size of the rectangle kernel is determined, the image decomposition can be accomplished using the conventional convolution method. However, the preferred embodiment of the present invention to decompose an image into low and high frequency components is computed using the following method. First given an image, I(x,y) defined for a rectangular region having corners at (0,0), and ($x_{max}$, $y_{max}$), the rectangle-of-interest is divided into nine sub-regions. These are defined as follows (FIG. 2):

sub-region 1: (0,0) to ($K_x/2$, $K_y/2$);
sub-region 2: ($K_x/2+1$, 0) to ($x_{max}-K_x/2-1$, $K_y/2$);
sub-region 3: ($x_{max}-K_x/2$,0) to ($x_{max}$, $K_y/2$);
sub-region 4: (0, $K_y/2+1$) to ($K_x/2$, $y_{max}-K_y/2-1$);
sub-region 5: ($K_x/2+1$, $K_y/2+1$) to ($x_{max}-K_x/2-1$, $y_{max}-K_y/2-1$);
sub-region 6: ($x_{max}-K_x/2$, $K_y/2+1$) to ($x_{max}$, $y_{max}-K_y/2-$);
sub-region 7: (0, $y_{max}-K_y/2$) to ($K_x/2$, $y_{max}$);
sub-region 8: ($K_x/2+1$, $y_{max}-K_y/2$) to ($x_{max}-K_x/2-1$, $y_{max}$);
sub-region 9: ($x_{max}-K_x/2$, $y_{max}-K_y/2$) to ($x_{max}$, $y_{max}$);

where $K_x$ is the number of columns in the kernel, $K_y$ is the number of rows in the kernel, $x_{max}$ and $Y_{max}$ are the number of columns and rows in the image. Each of the regions is processed as follows:

sub-regions 1, 2 and 3: vertical image sum buffers are created for each pixel in the first row of the rectangle-of-interest. The vertical image sum buffer for each column of the image is initialized to the sum of the first $K_y/2$ image pixels in that column. Prior to the calculations for each row in the sub-regions 1, 2 and 3 the vertical image sum buffers are augmented by the image value for that pixel in row $y+K_y/2$.

sub-region 1: the image accumulator is initialize to the sum of the first $K_x/2+1$ vertical image sum buffers. The pixel count accumulator is initialized to $(K_x/2+1)\times(K_y/2+1)$. The output image at the first pixel is the value of the image accumulator divided by the value of the pixel count accumulator. For pixel x in the each line the value of the $x+K_x/2$ vertical image sum buffer is added to the image accumulator and $K_y/2+1+y$ is added to the pixel count accumulator. The output image is the value of the image accumulator divided by the value of the pixel count accumulator.

sub-region 2: at each successive pixel the value of the $x+K_x/2$ vertical image sum buffer is added and the value of the $x-K_x/2-1$ vertical image sum buffer is subtracted from the image accumulator. The pixel count accumulator is unchanged. The output image is the value of the image accumulator divided by the value of the pixel count accumulator.

sub-region 3: at each successive pixel the value of the $x-K_x/2-1$ vertical image sum buffer is subtracted from the image accumulator and $K_y/2+1+y$ is subtracted from the pixel count accumulator. The output image is the value of the image accumulator divided by the value of the pixel count accumulator.

sub-regions 4, 5, and 6: the calculations for these regions are the same as those for regions 1, 2, and 3 respectively with the following exception. Prior to the calculations for each row in the sub-regions 4, 5 and 6 the vertical image sum buffers are augmented by image pixel value in row $y+K_y/2$ and reduced by the image pixel value in row $y-K_y/2-1$. The pixel count accumulator is adjusted appropriately in each of the three sub-regions.

sub-regions 7, 8, and 9: the calculations for these regions are the same as those for regions 1, 2, and 3 respectively with the following exception. Prior to the calculations for each row in the sub-regions 7, 8 and 9 the vertical image sum buffers are reduced by the image pixel value in row $y-K_y/2-1$. The pixel count accumulator is initialized to $(y_{max}-y+K_y/2+1)\times(K_x/2+1)$. The output image at the first pixel is the value of the image accumulator divided by the value of the pixel count accumulator.

sub-region 7: the image accumulator is initialize to the sum of the first $K_x/2+1$ vertical image sum buffers. The pixel count accumulator is initialized to $(K_x/2+1) \times (K_y/2+1)$. The output image at the first pixel is the value of the image accumulator divided by the value of the pixel count accumulator. For pixel x in the each line the value of the $x+K_x/2+1$ vertical image sum buffer is added to the image accumulator and the pixel count accumulator is incremented by $y+K_y/2+1-y_{max}$ to reflect the total number of pixels contributing to the convolution.

sub-region 8: at each successive pixel the value of the $x+K_x/2$ vertical image sum buffer is added and the value of the $x-K_x/2-1$ vertical image sum buffer is subtracted from the image accumulator. The pixel count accumulator is unchanged. The output image is the value of the image accumulator divided by the value of the pixel count accumulator.

sub-region 9: at each successive pixel the value of the $x-K_x/2-1$ vertical image sum buffer is subtracted from the image accumulator and $y+K_y/2+1-y_{max}$ is subtracted from the pixel count accumulator. The output image is the value of the image accumulator divided by the value of the pixel count accumulator.

Image Tone Scale Adjustment

In this section, the transform functions for tone scale adjustment are derived. When an image is displayed on a reflection print instead of film/lightbox, its luminance dynamic range is compressed dramatically, as is the perceived luminance. To produce the similar image tone scale, the JNDs which are perceived on the film/lightbox must be linearly mapped to the JNDs on the reflection print. This can be accomplished by using Blume's standard display function (H. Blume, "The acr/nema proposal for a grey-scale display function standard," *SPIE Medical Imaging*, Vol. 2707, pp. 344–360, 1996) as shown in Eq. 11, $$\log L_I = \frac{a + c \cdot \ln I + e \cdot (\ln I)^2 + g \cdot (\ln I)^3 + j \cdot (\ln I)^4}{1 + b \cdot \ln I + d \cdot (\ln I)^2 + f \cdot (\ln I)^3 + h \cdot (\ln I)^4 + k \cdot (\ln I)^5}, \quad (11)$$

where I is the index (1 to 1023) of the luminance levels $L_I$ of the JNDs, with $L_I$ ranging from 0.05 to 4000 cd/m², and a=−1.30119, b=−0.025840, c=0.080243, d=−0.10320, e=0.13647, f=0.028746, g=−0.025468, h=−0.0031979, j=0.0013635 and k=0.00012993.

Since the input data of a photographic printer is always represented by a certain unique optical density on the media, a transform function or a look-up-table (LUT) can be applied to linearize the printer input/output response based on the input/output characteristics of the printer. Therefore the output optical density of the printer can be linearly represented by its input. Furthermore, since a medical image is most likely displayed on a film, there exist means to transform the medical image to its film print density space. For example, a processed computed radiography image by the Kodak QCW Workstation (L. L. Barski, et al, "New automatic tone scale method for computed radiography," *SPIE Medical Imaging*, Vol. 3335, No. 18, 1998), or a CT/MRI image after applying a LUT based on the CIElab model of the human visual system. The objective here is to map an image from its film density space to its reflection print density space based on Blume's standard display function. Once the mapping is accomplished, the image will be printed on the reflection print media, which can create similar tone scale to the film. The density transform function is derived as follows.

Given a film optical density D, the luminance L produced by this density on a lightbox is expressed as $$L(D) = L_0 \cdot 10^{-D} \quad (12)$$

where $L_0$ is the luminance of the lightbox with a typical value of 2,500 cd/m² for example. The JND value JND corresponding to L(D) can be directly obtained from Eq. 11 together with its maximum and minimum values, $JND_{max}$ and $JND_{min}$. Similarly, given a density d on the reflection print, the luminance l produced by this density on the print can be expressed as $$l(d) = l_0 \cdot 10^{-d} \quad (13)$$

where $l_0$ is the luminance from a surface with 100% reflection of the ambient light, and a value of 150 cd/m² can be used for example in an indoor condition. The JND value jnd corresponding to l(d) can be obtained from Eq. 11 as well as its maximum and minimum values, $jnd_{max}$ and $jnd_{min}$. A linear transform is required between the JNDs of the film/lightbox and the JNDs of the reflection print, which can be expressed as $$\frac{jnd - jnd_{min}}{jnd_{max} - jnd_{min}} = \frac{JND - JND_{min}}{JND_{max} - JND_{min}}. \quad (14)$$

Therefore, a mapping function from any density on the film to a density on the reflection print has been established using Eqs. 12–14, i.e., $$D \rightarrow L(D) \rightarrow JND(L) \rightarrow jnd(l) \rightarrow l(d) \rightarrow d. \quad (15)$$

Figure 3:
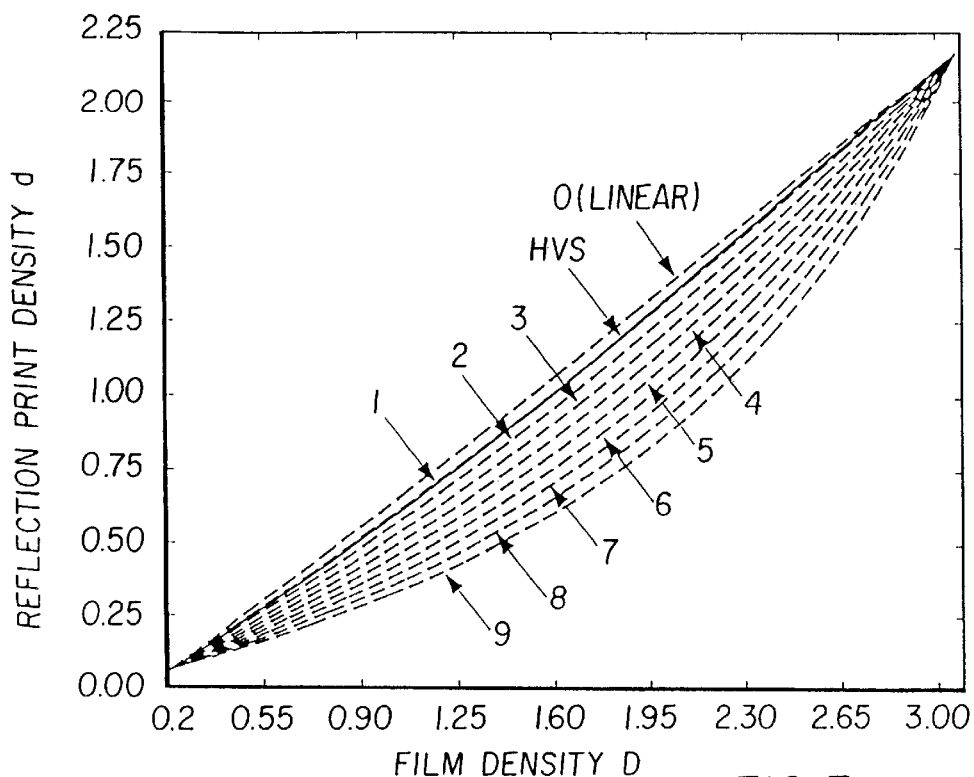
FIG. 3 is a graphical view showing mapping curves for image tone scale adjustment of reflection hardcopy prints. The HVS curve is obtained with $L_o=2,500$ cd/m$^2$, $l_o=150$ cd/m$^2$, $D_{min}=0.21$, $D_{max}=3.0$, $d_m=0.1$, and $d_{max}=2.2$.

Given the viewing condition and density characteristics of both the film/lightbox and the reflection print, using the transform as shown in Eq. 15 one can map any density on the film to a density on the reflection print in such a way that the image tone scale on both presentation media are similar. This is referred to as image tone scale adjustment. Such a HVS based mapping curve under certain conditions is shown in FIG. 3. It should be mentioned here that images which are represented in luminance space can be transformed as well to the reflection print density space using the mapping in Eq. 15.

The transform for HVS-based image tone scale adjustment is obtained with some assumptions: (1) the front surface reflection caused by the diffuse light is minimal since the reflection print can be manually adjusted to a favorable orientation, (2) the low luminance area of the reflection print do not fall out of the Weber region, and (3) et al. In practice, these assumptions are not always true. The standard display function as expressed by Eq. 11 is based on Barten's HVS model, which uses a special test target and signal modulation. Since a medical image contains signals of complicated frequency components and modulations, the image may not exactly follows the HVS curve in FIG. 3. However, one can believe that the curve is still a good first order approximation and that its shape should be correct based on the derivations in this section, i.e., to transform a film density to a reflection print density, higher density needs more contrast enhancement than lower density, or equivalently, local contrast in the shadow region needs more boost than that in the highlight region. Mathematically speaking, for any two film densities, $D_1$ and $D_2$ with $D_1 < D_2$, the derivative of the function d=T(D) used for image tone scale adjustment should satisfy Ineq. 16

$$\left.\frac{dT(D)}{dD}\right|_{D=D2} \geq \left.\frac{dT(D)}{dD}\right|_{D=D1} \geq 0. \qquad (16)$$

Based on the above assumption, one can generate a series of curves (FIG. 3) which satisfy Ineq.16 for image tone scale adjustment, and the selection of one particular curve should be depending on factors including the observer's preference, the viewing condition and the diagnostic regions of interest. The mapping curves in FIG. 3 are created according Eq. 17

$$\frac{d - d_{\min}}{d_{\max} - d_{\min}} = \frac{D - D_{\min}}{D_{\max} - D_{\min} + k(D_{\max} - D)}, \qquad (17)$$

where $d_{min}$, $d_{max}$, $D_{min}$ and $D_{max}$ are the minimum and maximum densities of the reflection print and film, respectively, k is a non-negative constant and is used to generate different transform curves. Curve 0–9 are created with k being equal to 0.00, 0.15, 0.27, 0.56, 0.73, 0.92, 1.15, 1.41, 1.72 and so on, respectively. In practice, a value of k=0.56 will produce a fairly pleasing image tone scale. Also one can find in FIG. 3 that the HVS curve is pretty close to curve 1, which shows that Eq. 17 is a good mathematical approximation in generating the transform functions for image tone scale adjustment.

It should be mentioned here that a CIElab based LUT to transform a CT or MRI image to density space can be any of the transform curves in FIG. 3.

Figure 4:
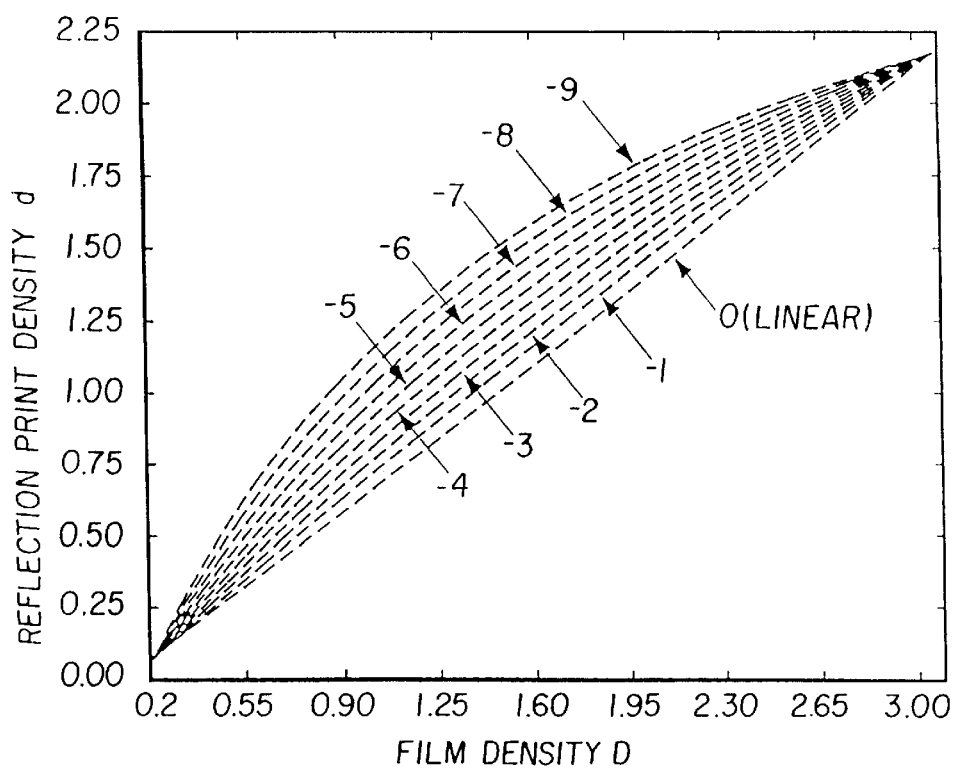
FIG. 4 is a graphical view of mapping curves for image tone scale adjustment of transparency hardcopy prints.

The transforms as shown in FIG. 3 make the mid-tone region of an image on the reflection hardcopy appear brighter. For transparency prints, since the highest density which can be produced by the printer is usually less than 3.0. When such an image is displayed on the lightbox, the image looks brighter and flatter than film. To compensate for the density limitation and to achieve a comparable image tone scale on the transparency, a set of transforms which can increase the mid-tone density therefore make the image appear darker are shown in FIG. 4. Generally speaking, for any two film densities, $D_1$ and $D_2$ with $D_1<D_2$, the derivative of the function d=T(D) used for image tone scale adjustment should satisfy $$\left.\frac{dT(D)}{dD}\right|_{D=D2} \leq \left.\frac{dT(D)}{dD}\right|_{D=D1} \geq 0. \qquad (18)$$

In FIG. 4, the curves are created using Eq. 17 with k being set to 0.00, −0.15, −0.27, −0.56, −0.73, −0.92, −1.15, −1.41, −1.72 and so on, respectively.

It can be readily concluded that the transform functions are capable of accomplishing two tasks simultaneously: (1) generating an image on the hardcopy print with similar tone scale to a film, and (2) dynamic range compression of the input image. Since both operations are accomplished in one step using a single LUT, the computation efficiency has been greatly improved by the present invention.

The invention has been described in detail with particular reference to certain preferred embodiments thereof, but it will be understood that variations and modifications can be effected within the spirit and scope of the invention.

PARTS LIST 300 computer
310 memory
312 input device
314 display
316 central processing unit
318 output device
320 control/data bus
322 output device
324 transportable storage media
326 network interface
328 network output device
330 computer network
332 network input device
334 network storage device

What is claimed is:

1. A method for the enhancement of medical images for hardcopy prints comprising the steps of:

obtaining a medical image having a shadow region and a highlight region in digital format;

conducting a plurality of operations for Human Visual System (HVS)-based edge enhancement with each operation having a uniquely specified high frequency amplification function and range such that edges are more enhanced in the shadow region than in the highlight region;

adjusting image tone scale, for reflection prints increase the contrast in the shadow region and decrease the contrast in the highlight region, and for transparency prints decrease the contrast in the shadow region and increase the contrast in the highlight region;

sending the processed image to an output device for producing hardcopy prints; and wherein said conducting step is based on $P_{n-1}=L_n+\alpha_n*H_n$, and wherein $L_n$ and $H_n$ are the respective low frequency and high frequency components of image $P_n$ at processing step n, $\alpha_n$ is the amplification function and $n \geq 0$.

2. The method according to claim 1 wherein said medical image is obtained from a variety of modalities of medical imaging, including, but not limited to, one of the following: Computed Radiography, Direct Radiography, radiographic digitizer, Computed Tomography, Magnetic Resonance Imaging, Ultrasound Imaging, Nuclear Imaging, digital angiography, and digital fluorography.

3. The method according to claim 1 wherein said medical image in digital format is in film optical density space, including, but not limited to, scaled optical density space.

4. The method according to claim 1 wherein said obtaining step includes converting a digital image to the film optical density space using a transform curve as in FIG. 3.

5. The method according to claim 1 wherein said high frequency amplification function and range are determined by the human visual system, as well as medical imaging modality, diagnostic region of interest and the characteristics of the output device.

6. The method according to claim 1 wherein said amplification is performed in such a way that said high frequency range is emphasized more in the image shadow region than in the image highlight region.

7. The method according to claim 1 wherein the low frequency and high frequency components are obtained using a convolution filter, including but limited to a linear convolution filter and a non-linear convolution filter. The linear convolution filter includes but is not limited to a high-pass filter such as a Laplacian filter, and a low pass filter such as a rectangle uniform convolution filter.

8. The method according to claim 7 wherein the kernel shape is based on $$\frac{K_x}{K_y} = \frac{P_y}{P_x}.$$

9. The method according to claim 7 wherein the kernel size is based on imaging modality, diagnostic regions of interest and the characteristics of the output device.

10. The method according to claim 7 wherein the low frequency and high frequency components are obtained using $7^{an}$ image decomposition method.

11. The method according to claim 1 wherein the amplification function $\alpha_n$ is a function of the low frequency image component $L_n$ and it monotonically increases as $L_n$ changes from highlight region to shadow region.

12. The method according to claim 1 wherein the amplification function $\alpha_n$ is a function of image $P_n$ and it monotonically increases as $P_n$ changes from highlight region to shadow region.

13. The method according to claim 1 wherein the amplification function $\alpha_n$ is a function of image $P_n$ and it monotonically increases as $P_n$ changes from highlight region to shadow region.

14. The method according to claim 1 wherein the amplification function $\alpha_n$ is based on $$\alpha_n = \alpha_{\min} + (\alpha_{\max} - \alpha_{\min}) \cdot \frac{L_n - L_{\min}}{L_{\max} - L_{\min}};$$

wherein $d_{min}$ and $d_{max}$ are respectively the minimum and maximum values of d and $L_{min}$ and $L_{max}$ are respectively the minimum and maximum values of $L_n$ the low frequency component.

15. The method according to claim 1 wherein the amplification function $\alpha_n$ is a constant.

16. The method according to claim 1 wherein said conducting step is based on $$P_{n+1} = L_0 + \sum_{i=0}^{n} [\alpha_n \cdot H_n];$$

where $n \geq 0$ is the index for processing steps;

$L_0$ is the low frequency component of the original image 0;

$H_n$ is the high frequency component of image 0 at processing step n;

$P_{n+1}$ is the resulting image; and $\alpha_n$ is the amplification function.

17. The method according to claim 16 wherein the low frequency and high frequency components are obtained using a convolution filter, including but limited to a linear convolution filter and a non-linear convolution filter, wherein the linear convolution filter includes, but is not limited to, a high-pass filter such as a Laplacian filter, and a low pass filter, such as a rectangle uniform convolution.

18. The method according to claim 18 using a kernel shape is based on $$\frac{K_x}{K_y} = \frac{P_y}{P_x};$$

where $P_x$ and $P_y$ are the pixel width and pixel height, respectively;

$K_x$ and $K_y$ are the kernel width and height, respectively.

19. The method according to claim 17 using a kernel size which is based on imaging modality, diagnostic regions of interest and the characteristics of the output device.

20. The method according to claim 7 wherein the low frequency and high frequency components are obtained using the image decomposition method as in FIG. 2.

21. The method according to claim 16 wherein the amplification function $\alpha_n$ is a function of the low frequency image component $L_0$ and it monotonically increases as $L_0$ changes from highlight region to shadow region.

22. The method according to claim 16 wherein the amplification function $\alpha_n$ is based on $$\alpha_n = \alpha_{\min} + (\alpha_{\max} - \alpha_{\min}) \cdot \frac{L_0 - L_{\min}}{L_{\max} - L_{\min}}.$$

23. The method according to claim 16 wherein the amplification function $\alpha_n$ is a constant.

24. The method according to claim 1 wherein said adjusting image tone scale step uses a function which is based on the derivation based on:

$$\log L_l = \frac{a + c \cdot \ln l + e \cdot (\ln l)^2 + g \cdot (\ln l)^3 + j \cdot (\ln l)^4}{1 + b \cdot \ln l + d \cdot (\ln l)^2 + f \cdot (\ln l)^3 + h \cdot (\ln l)^4 + k \cdot (\ln l)^5};$$

$$L(D) = L_0 \cdot 10^{-D};$$

$$l(d) = l_0 \cdot 10^{-D};$$

$$\frac{jnd - jnd_{\min}}{jnd_{\max} - jnd_{\min}} = \frac{JND - JND_{\min}}{JND_{\max} - JND_{\min}}; \text{ and}$$

$$D \to L(D) \to JND(L) \to jnd(l) \to l(d) \to d.$$

25. The method according to claim 1 wherein said adjusting tone scale step for reflection prints uses a function which increases the image contrast in the shadow region while decreases the contrast in the highlight region.

26. The method according to claim 1 wherein said adjusting tone scale step for transparency prints uses a function which decreases the image contrast in the shadow region while increases the contrast in the highlight region.

27. The method according to claim 1 wherein said adjusting tone scale step for transparency prints uses a function which is based on $$\left.\frac{dT(D)}{dD}\right|_{D=D2} \geq \left.\frac{dT(D)}{dD}\right|_{D=D1} \geq 0,$$

where $D_1 < D_2$; and D is density.

28. The method according to claim 1 wherein said adjusting tone scale step for transparency prints uses a function which is based on $$\left.\frac{dT(D)}{dD}\right|_{D=D2} \leq \left.\frac{dT(D)}{dD}\right|_{D=D1} \geq 0,$$

where $D_1 < D_2$; and D is density.

29. The method according to claim 1 wherein said adjusting tone scale step uses a function which is based on $$\frac{d - d_{min}}{d_{max} - d_{min}} = \frac{D - D_{min}}{D_{max} - D_{min} + k(D_{max} - D)},$$

where k≧0 for reflection prints and k≦0 for transparency prints; and d and D are densities.

30. The method according to claim 1 wherein said sending the processed image step includes linearizing the response of output optical density and input code value of said output device.

31. The method according to claim 1 wherein said adjusting tone scale step and said sending the processed image step is actually one step in case said output device can provide the required tone scale curve.

32. A computer storage product comprising:
   a computer readable storage medium having a computer program for performing a method for the enhancement of medical images for hardcopy prints comprising the steps of:
      obtaining a medical image in digital format;
      conducting a plurality of operations for Human Visual System (HVS)-based edge enhancement with each operation having a uniquely specified high frequency amplification function and range such that edges are more enhanced in the shadow region than in the highlight region;
      adjusting image tone scale, for reflection prints increase the contrast in the shadow region and decrease the contrast in the highlight region, and for transparency prints decrease the contrast in the shadow region and increase the contrast in the highlight region;
      sending the processed image to the output device for hardcopy prints.

33. The method of claim 1 wherein said medical image in digital format is obtained through a network interface from a network input device.

34. The method of claim 1 wherein said processed image is sent through a network interface to a network output device.

35. The method of claim 1 wherein said medical image in digital format is obtained through a network interface from a network storage device.

* * * * *